US008824398B2

(12) United States Patent
Jia et al.

(10) Patent No.: US 8,824,398 B2
(45) Date of Patent: Sep. 2, 2014

(54) RADIO COMMUNICATION SYSTEM, RADIO COMMUNICATION DEVICE, AND RADIO COMMUNICATION METHOD

(75) Inventors: Yunjian Jia, Yokohama (JP); Takashi Yano, Tokorozawa (JP); Shigenori Hayase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 13/389,309

(22) PCT Filed: Aug. 12, 2009

(86) PCT No.: PCT/JP2009/003878
§ 371 (c)(1),
(2), (4) Date: Feb. 14, 2012

(87) PCT Pub. No.: WO2011/018824
PCT Pub. Date: Feb. 17, 2011

(65) Prior Publication Data
US 2012/0134335 A1    May 31, 2012

(51) Int. Cl.
H04W 72/04 (2009.01)
H04B 7/04 (2006.01)
(52) U.S. Cl.
CPC .................................. *H04B 7/0417* (2013.01)
USPC ........................................... 370/329; 370/334
(58) Field of Classification Search
None
See application file for complete search history.

(56) References Cited

U.S. PATENT DOCUMENTS 8,165,533 B2 *   4/2012  Heath et al. ...................... 455/69
8,229,017 B1 *   7/2012  Lee et al. ....................... 375/267

2004/0081073 A1*  4/2004  Walton et al. .................. 370/204
2009/0016460 A1*  1/2009  Hwang et al. .................. 375/267
2009/0196365 A1*  8/2009  Takano .......................... 375/260
2010/0182975 A1*  7/2010  Malladi et al. ................. 370/330
2010/0296598 A1* 11/2010  Li et al. .......................... 375/267
2013/0115999 A1*  5/2013  Sirotkin et al. ................ 455/522
2013/0142125 A1*  6/2013  Shimezawa et al. .......... 370/328

FOREIGN PATENT DOCUMENTS

| CN | 1717889 A | 1/2006 |
|---|---|---|
| CN | 101369837 A | 2/2009 |
| JP | 2005-328310 A | 11/2005 |
| JP | 2008-301494 A | 12/2008 |
| JP | 2008-545293 A | 12/2008 |
| WO | 2006/098379 A | 9/2006 |
| WO | 2008/042904 A2 | 4/2008 |

OTHER PUBLICATIONS

3GPP R1-070236, "Precoding for E-UTRA downlink MIMO", LG Electronics, Samsung and NTT-DoCoMo, Jan. 15-19, 2007.

(Continued)

*Primary Examiner* — Hassan Kizou
*Assistant Examiner* — Tejis Daya
(74) *Attorney, Agent, or Firm* — Mattingly & Malur, PC

(57) ABSTRACT

A transmitting station having plural antennas includes: a control information calculation unit that calculates control information for use by plural receiving stations according to a multi-user MIMO data transmission scheme; a control information transmission parameter calculation unit that calculates a control information transmission parameter based on spatial channel related information; and a control information transmission signal creation unit that creates a control information transmission signal, using the control information transmission parameter and a pilot signal. A resource element mapping unit maps control information transmission signals onto corresponding resource elements for transmission. On the other hand, the receiving stations each include a control information acquisition unit that acquires plural pieces of control information signaled on the corresponding resource elements, acquire control information destined for each receiving station, and demodulate received signals.

15 Claims, 13 Drawing Sheets

(56) References Cited

OTHER PUBLICATIONS

3GPP R1-090601, "Downlink CoMP Transmission using DPC MIMO", Hitachi, Feb. 9-13, 2009.

3GPP R1-090602, "An Efficient DPC MIMO Scheme for Downlink CoMP in LTE-A", Feb. 9-13, 2009.

3GPP R1-091180, "Further Considerations for Downlink CoMP Transmission using DPC MIMO", Hitachi, Mar. 23-27, 2009.

3GPP R1-092734, "Downlink Demodulation RS design for ReI-9 and beyond", Ericsson, ST-Ericsson, Jun. 29-Jul. 3, 2009.

S. Hayase et al, "MIMO-BC Transmission using ZF-DPC with Rx Beamforming", Proceedings of the 2009 IEICE General Conference, IEICE, Mar. 4, 2009, pp. 462, B-5-29.

Chinese Office Action received in Chinese Application No. 200980160838.4 dated Mar. 4, 2014.

* cited by examiner $h_{i,j}$: RADIO PATHS BETWEEN TX ANTENNAS j TO RX ANTENNAS i

FIG. 2B

SPATIAL CHANNEL
(REPRESENTED BY RADIO PATH MATRIX H WHOSE ELEMENTS
ARE RADIO PATHS BETWEEN ALL TX/RX ANTENNAS)

$H_1$: SPATIAL CHANNEL BETWEEN BASE STATION 200 AND TERMINAL 210

$$H = \begin{bmatrix} h_{211,201} & h_{211,202} & h_{211,203} & h_{211,204} \\ h_{212,201} & h_{212,202} & h_{212,203} & h_{212,204} \\ h_{221,201} & h_{221,202} & h_{221,203} & h_{221,204} \\ h_{222,201} & h_{222,202} & h_{222,203} & h_{222,204} \end{bmatrix}$$

$H_2$: SPATIAL CHANNEL BETWEEN BASE STATION 200 AND TERMINAL 220

FIG. 3

EFFECTIVE CHANNELS FOR DATA TRANSMISSION
(VIRTUAL CHANNELS BETWEEN TRANSMITTED DATA AND RECEIVED DATA)

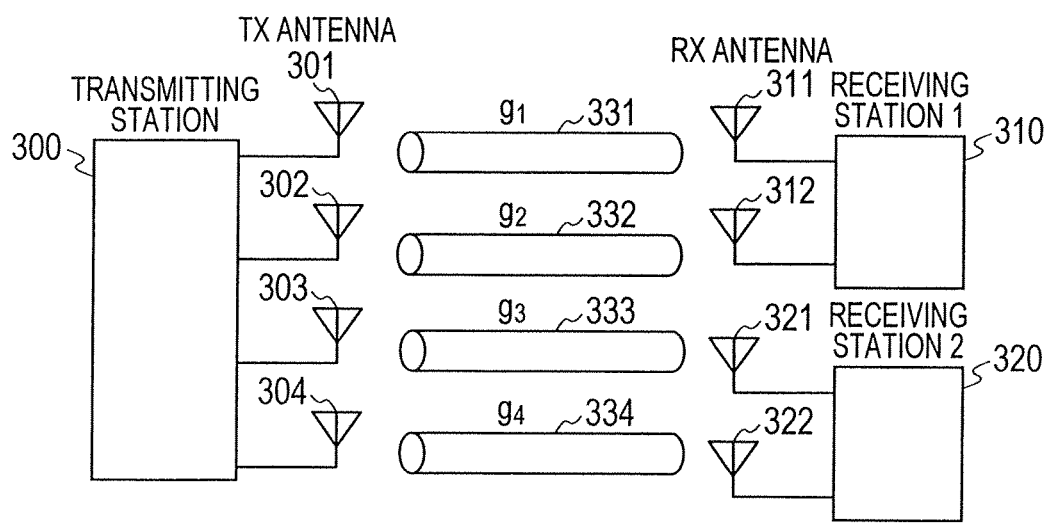

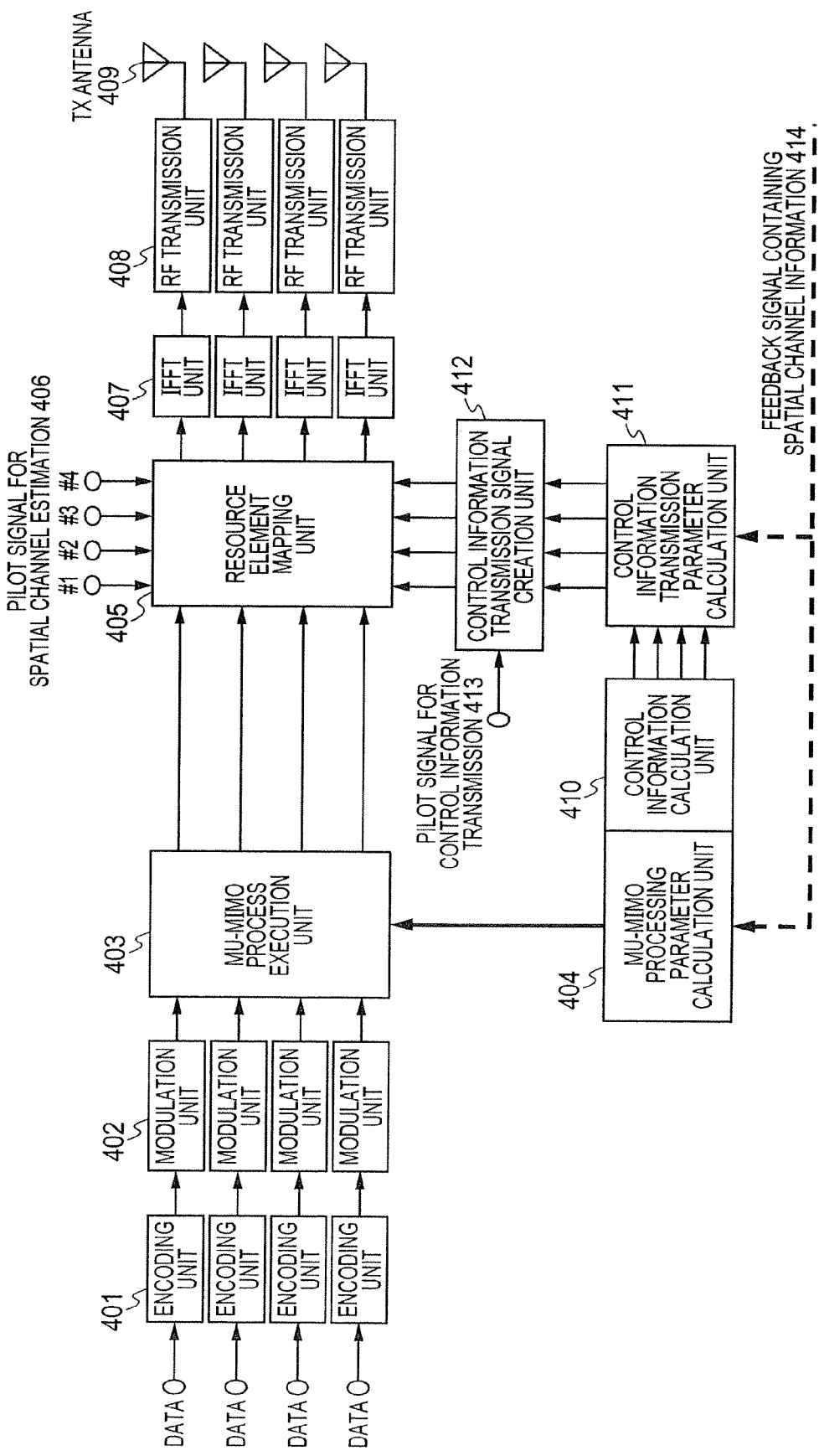

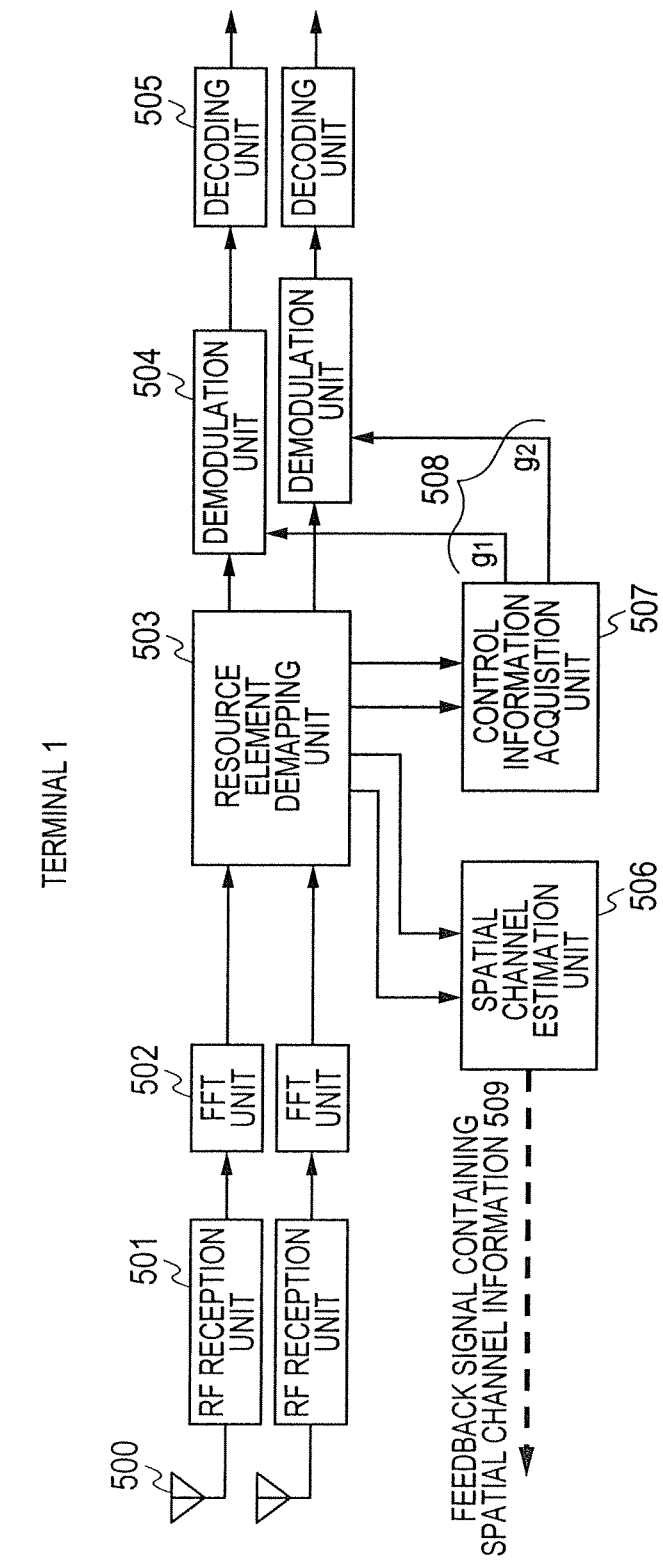

RADIO COMMUNICATION SYSTEM, RADIO COMMUNICATION DEVICE, AND RADIO COMMUNICATION METHOD

TECHNICAL FIELD

The present invention relates to a technical field of radio communication and particularly relates to a radio communication technique for implementing communication using plural antennas.

BACKGROUND ART

Lately, Multiple Input Multiple Output (MIMO) data transmission using plural antennas attracts attention in order to enhance the data rate and/or quality of radio communication. In MIMO data transmission, it is possible to accomplish parallel transmission of plural pieces of data, such that a transmitting station transmits plural pieces of data at a same frequency and concurrently, using plural transmit antennas, and a receiving station receives data with plural receive antennas and demultiplexes the data.

Moreover, Multi-User (MU) MIMO, i.e., MIMO data transmission between a transmitting station having plural antennas and multiple receiving stations is under consideration. In MU-MIMO data transmission, paths between the plural antennas of the transmitting station and all antennas of the multiple receiving stations are regarded as a MIMO channel. The transmitting station concurrently transmits individual data signals to each of the receiving stations and the multiple receiving stations concurrently access the MIMO channel, so that system throughput can be improved.

With MIMO or MU-MIMO data transmission, plural pieces of data concurrently transmitted in parallel (called data transmission of plural layers) are first mixed in a spatial channel. Accordingly, it is necessary to implement demultiplexing the plural pieces of data at the receiving stations. Diverse methods for this implementation are proposed. MIMO data transmission includes, for example, an eigen beam space division multiplexing (ESDM: Eigen Beam SDM) scheme in which, on a MIMO channel, plural orthogonal beams between transmitting and receiving stations are formed by MIMO transmission processing and MIMO reception processing, and plural pieces of data are transmitted using these orthogonal beams (see patent literature 1). Meanwhile, in MU-MIMO data transmission, since receiving stations cannot cooperate with each other, a transmitting station needs to perform transmission processing so that signals destined for each receiving station do not arrive at another receiving station. For this purpose, MU-MIMO transmission processing initiative by the transmitting station, i.e., so-called precoding is used (see non-patent literature 1 and non-patent literature 2). Furthermore, in a case where each receiving station has plural antennas, combined usage of MU-MIMO transmission processing at a transmitting station and MU-MIMO reception processing at a receiving station is possible (see non-patent literature 3 and non-patent literature 4).

Then, in order to properly demodulate data demultiplexed for each receiving station, each receiving station needs to know an effective channel for each transmission data (each layer) in MIMO or MU-MIMO data transmission. This effective channel is defined as a virtual channel between each received data and transmitted data corresponding to the received data, after data transmitted in parallel by MIMO processing or MU-MIMO transmission and/or reception processing has been demultiplexed for each receiving station. That is, it represents a change (gain) obtained for each layer, resulting from MIMO/MU-MIMO transmission and reception processing. After having known this effective channel, i.e., this change (gain), each receiving station demodulates and decodes data of each layer. Because all receive antennas are located on one receiving station in MIMO transmission and the receiving station can estimate an entire spatial channel, it can calculate effective channels that are formed by the MIMO transmission and reception processing, if arrangements for MIMO transmission and reception processing for data are established between the transmitting station and receiving station. Meanwhile, each receiving station in MU-MIMO can estimate only a part of a spatial channel and, therefore, it is for the receiving station impossible to calculate effective channels.

CITATION LIST

Patent Literature

Patent Literature 1: Japanese Patent Application Laid-Open Publication No. 2005-328310

Non-Patent Literature

Non-patent Literature 1: 3GPP R1-070236, "Precoding for E-UTRA downlink MIMO", LG Electronics, Samsung and NTT-DoCoMo Non-patent Literature 2: 3GPP R1-090601, "Downlink CoMP Transmission using DPC MIMO", Hitachi Non-patent Literature 3: 3GPP R1-090602, "An Efficient DPC MIMO Scheme for Downlink CoMP in LTE-A", Hitachi Non-patent Literature 4: 3GPP R1-091180, "Further Consideration on Downlink CoMP Transmission using DPC MIMO", Hitachi Non-patent Literature 5: 3GPP R1-092734, "Downlink demodulation RS design for Rel-9 and beyond", Ericsson, ST-Ericsson

SUMMARY OF INVENTION

Technical Problem

As noted in non-patent literature 3, in a case where receiving stations in MU-MIMO have plural receive antennas, the receiving stations also perform MIMO reception processing, so that MU-MIMO data transmission throughput can be improved. However, in a MU-MIMO scheme in which a transmitting station calculates MIMO reception processing parameters for use by the receiving stations, it is needed to signal these parameters to the receiving stations by any way. That is, in order to complete MU-MIMO data transmission, the receiving stations have to acquire the above-mentioned effective channel gains and MIMO reception processing parameters.

However, no disclosure as to how each receiving station acquires the foregoing control information is found in the prior art documents mentioned above.

By a method that, referring to a spatial channel information estimation method, a transmitting station transmits plural pilot signals using different time sub-frames or different frequencies or different spread codes and each receiving station estimates control information, it is needed to prepare resource elements as many as the number of pieces of control information, thus resulting in an increase in overhead.

Meanwhile, a method that, by utilizing a data transmission method, a transmitting station multiplies control information by a precoding matrix for data and transmits it and each receiving station receives the control information involves a problem that each receiving station is unable to receive the control information multiplied by the precoding matrix without interference, depending on some MU-MIMO scheme for data transmission (for example, a DPC (Dirty Paper Coding) MU-MIMO scheme). Besides, in MU-MIMO transmission in which it is required to acquire MU-MIMO reception processing parameters, there is a problem that each receiving station is unable to receive the control information multiplied by the precoding matrix without interference.

The present invention has been contrived by considering the foregoing matters and is to provide a radio communication system, a radio communication device, and a radio communication method enabling efficient transmission of control data for data reception and demodulation in diverse MU-MIMO data transmission schemes.

Solution to Problem

In order to achieve the foregoing object, the present invention provides a radio communication system in which a transmitting station having plural antennas transmits individual data signals destined for each of plural receiving stations. In the radio communication system, the transmitting station transmits control information that is used for transmitting and receiving the data signals to the receiving stations, based on spatial channel related information, and each of the receiving stations controls receiving the data signals, using the control information it received.

In order to achieve the foregoing object, the present invention also provides a radio communication device that transmits data by a multi-user MIMO scheme in a radio communication system. The radio communication device includes a radio unit that calculates control information for use by plural receiving stations, calculates a control information transmission parameter based on this control information and spatial channel related information, generates a control information transmission signal by combining this control information transmission parameter and a pilot signal, and transmits the generated control information transmission signal to the plural receiving stations.

In order to achieve the foregoing object, the present invention further provides a radio communication device that receives data by a multi-user MIMO scheme in a radio communication system, the radio communication device including a radio unit that acquires control information transmitted from a transmitting station and controls receiving the data, using the acquired control information.

According to an exemplary embodiment of the present invention, a radio communication system is configured in which a transmitting station having plural antennas transmits data by an MU-MIMO scheme to plural receiving stations. The transmitting station includes a control information calculation unit that calculates control information for use by the plural receiving stations according to an MU-MIMO data transmission scheme; a control information transmission parameter calculation unit that calculates a control information transmission parameter based on spatial channel related information; and a control information transmission signal creation unit that creates a control information transmission signal, using the control information transmission parameter and a pilot signal. Control information transmission signals are mapped onto corresponding resource elements and transmitted. The plural receiving stations include a control information acquisition unit that acquires plural pieces of control information signaled on the corresponding resource elements.

Advantageous Effects of Invention

According to the radio communication system of the present invention, it is possible to lessen the overhead for transmitting control information. Furthermore, a control information transmission method for the system of the present invention can be accommodated for diverse MU-MIMO schemes.

BRIEF DESCRIPTION OF DRAWINGS

FIG. 2B is a diagram representing a concept of a spatial channel of the radio paths in FIG. 2B.

FIG. 3 is a diagram that equivalently represents effective channels for data transmission by the MU-MIMO transmission method.

FIG. 4 is a diagram showing functional blocks in a core part of a base station device pertaining to a first exemplary embodiment.

FIG. 5 is a diagram showing functional blocks in a core part of a terminal device pertaining to the first exemplary embodiment.

DESCRIPTION OF EMBODIMENTS

In the following, a radio communication system, a radio communication device, and a radio communication method pertaining to embodiments of the present invention will be described in detail with reference to the drawings. Although some exemplary embodiments of the present invention are described herein, classification of the exemplary embodiments is not essential for the present invention and another exemplary embodiment may be used as required. The present invention is applicable to a radio system in which radio signals are transmitted and received; in the following, however, descriptions are provided concerning examples in which the invention is applied to a cellular system or mobile communication system or mobile phone system.

Figure 1:
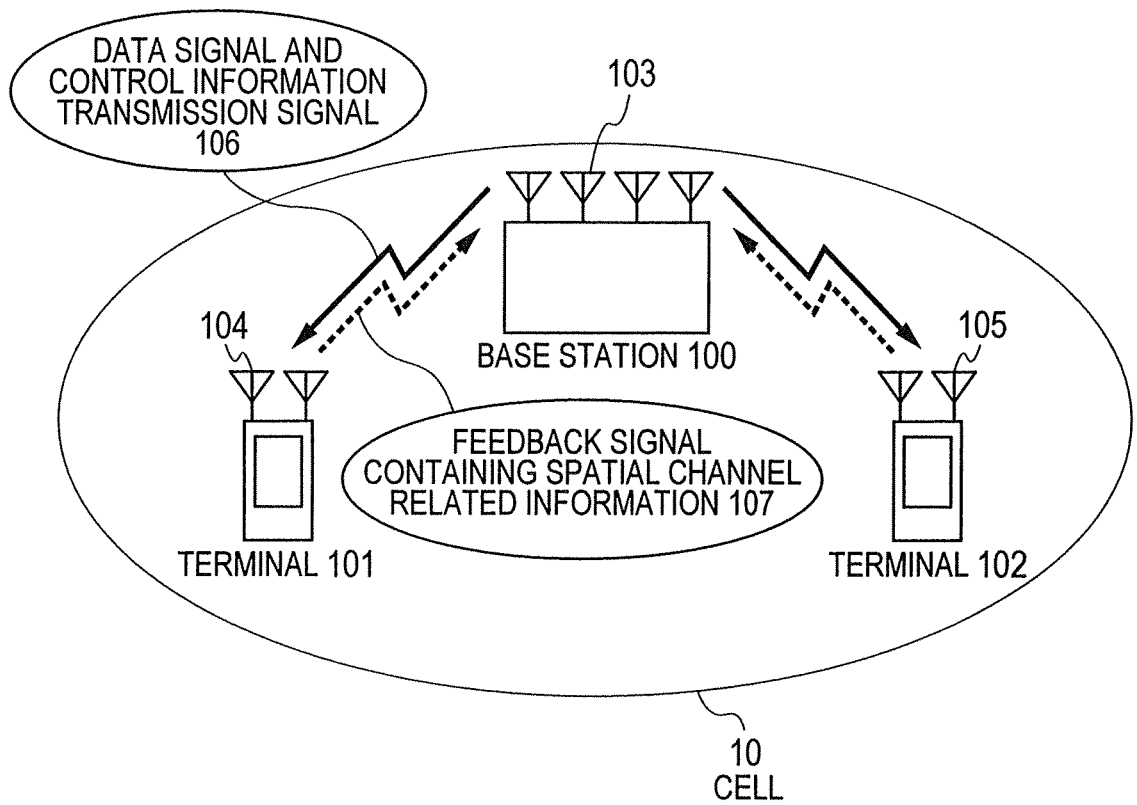
FIG. 1 is a schematic diagram showing a radio communication system using a multi-user MIMO (MU-MIMO) transmission method pertaining to respective exemplary embodiments.

FIG. 1 shows an exemplary cellular system in which various embodiments provided herein are applied. In this figure, one base station 100 can be provided in one cell 10 and this base station 100 transmits plural pieces of data to one or more terminals 104, 105 by MU-MIMO transmission, using plural antennas 103. For simplicity of description, in the following exemplary embodiments, the base station concurrently transmits two pieces of data to two terminals 101, 102, respectively (a total of four pieces of data) on a same frequency, using four transmit antennas 103. Each terminal receives two pieces of data transmitted to it, respectively, using two receive antennas 104, 105. The number of pieces of transmission data, the number of terminals, the number of antennas, and other values are only exemplary and any other suitable numbers and/or values may be used. Reference numeral 106 denotes a data signal and a control information transmission signal being transmitted from the base station 103 to the terminal 101 and reference numeral 107 denotes a feedback signal containing spatial channel related information being transmitted from the terminal 104 to the base station 103.

Figure 2A:
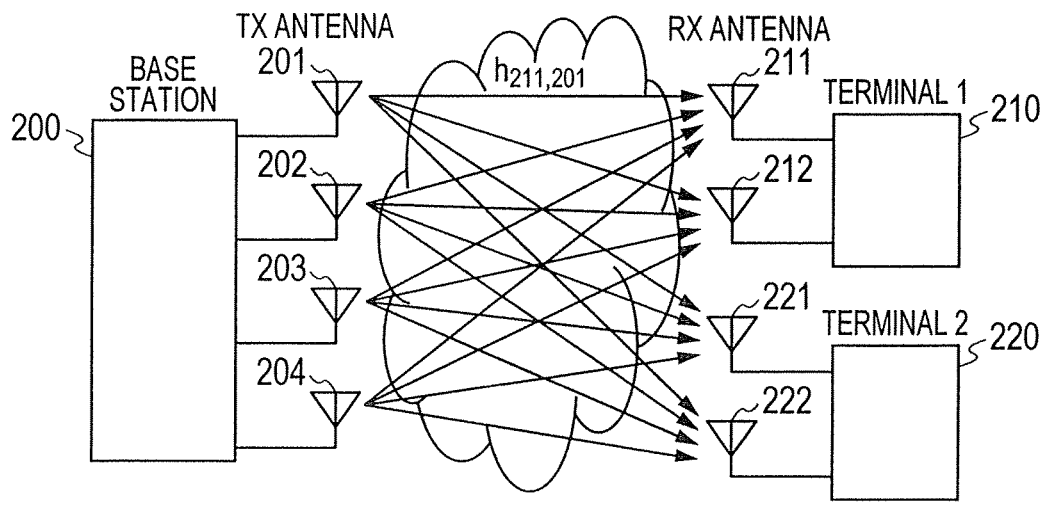
FIG. 2A is a diagram representing a concept of radio paths for the MU-MIMO transmission method of FIG. 1.

FIG. 2A and FIG. 2B is a diagram that schematically shows radio paths and a spatial channel between the base station and the terminals in one of diverse exemplary embodiments of the system shown in FIG. 1. In the spatial channel of FIG. 2A, signals transmitted from the transmit antennas 201 to 204 of a base station 200 corresponding to the base station 100 in FIG. 1 are mixed and received by the receive antennas 211 to 222 of terminals 210, 220 corresponding to the terminals 104, 105 in FIG. 1. FIG. 2B is a diagram representing a radio path matrix H whose elements are radio paths between all transmit/receive antennas, in which $H_1$ and $H_2$ denote a spatial channel between the base station 200 and the terminal 210 and a spatial channel between the base station 200 and the terminal 220, respectively.

FIG. 3 equivalently represents effective channels 331 to 334 for data of data transmission by MU-MIMO precoding between a transmitting station 300 corresponding to the base station 200 in FIG. 2A and receiving stations 310, 320 corresponding to the terminals 210, 220. Descriptions will be provided later concerning effective channel gains $g_1$, $g_2$, $g_3$, $g_4$ of the effective channels 331 to 334 that implement parallel transmission of data in FIG. 3. Reference numerals 301 to 304 and 311 to 322 denote the antennas of the transmitting station 300 and the receiving stations 310, 320, respectively.

In the following exemplary embodiments, descriptions are provided using a radio communication system that carries out MU-MIMO transmission based on OFDM (Orthogonal Frequency Division Multiplexing) signal transmission; therefore, a configuration is illustrated such that a base station performs transformation of an OFDM signal by means of an IFFT (Inverse Fast Fourier Transform) processing unit and a terminal performs inverse transformation of an OFDM signal by means of a FFT (Fast Fourier Transform) processing unit. However, it is not essential to use the OFDM signal transmission and the present invention may be used for other signal transmission systems than the OFDM signal. For example, the invention may be used for signal transmission systems such as CDMA (Code Division Multiple Access) and SC-FDMA (Single-Carrier Frequency Division Multiple Access).

Embodiment 1

A first exemplary embodiment relates to a data transmission system that implements MU-MIMO data transmission only by MU-MIMO processing at the base station. That is, the terminals do not perform MIMO reception processing. In other words, control information for MU-MIMO data transmission in this exemplary embodiment only comprises effective channel gains $g_1$, $g_2$, $g_3$, $g_4$ mentioned with regard to FIG. 3.

A part of functional structure of a base station (corresponding to 100 in FIG. 1, 200 in FIG. 2, and 300 in FIG. 3) in the system of this exemplary embodiment is shown in FIG. 4. Here, an encoding unit 401, a modulation unit 402, an MU-MIMO process execution unit 403, a resource element mapping unit 405, a pilot signal for spatial channel estimation 406, an IFFT (Inverse Fast Courier Transform) unit 407, an RF (Radio Frequency) transmission unit 408, a transmit antenna 409 are components comprised in a usual base station device. However, an MU-MIMO processing parameter calculation unit 404, a control information calculation unit 410, a control information transmission parameter calculation unit 411, and a control information transmission signal generating unit 412 are further added to the base station in this exemplary embodiment in order to transmit control information for MIMO data transmission to respective terminals from the base station.

The base station shown in FIG. 4 first transmits pilot signals for spatial channel estimation 406. By using the pilot signals for spatial channel estimation 406 transmitted from the base station, terminal 1 and terminal 2 (corresponding to 101, 102 in FIG. 1, 210, 220 in FIG. 2, and 310, 320 in FIG. 3) estimate spatial channels H1, H2 between itself and the base station, respectively, and feed back information for estimated H1 and H2, i.e., feedback signals containing spatial channel information 414 to the base station. From the feedback signals containing spatial channel information 414 from terminal 1 and terminal 2, the base station obtains information about a spatial channel H which is a radio path matrix as expressed in the following equation.

[Equation 1]

$$H = \begin{bmatrix} H1 \\ H2 \end{bmatrix} \quad (1)$$

Based on this information about the special channel H, the based station determines an MU-MIMO data transmission scheme, calculates MU-MIMO transmission processing parameters by means of the MU-MIMO processing parameter calculation unit 404, and performs MU-MIMO processing for plural pieces of data. Any MU-MIMO data transmission scheme, not limited to a specific scheme, may be adopted at the base station. In the following, descriptions are provided for an example where the base station is assumed to use a nonlinear MU-MIMO data transmission scheme utilizing DPC (Dirty Paper Coding). In this case, the MU-MIMO process execution unit 403 includes two parts of DPC processing and transmission matrix multiplication processing. Parameters that are used by each part are calculated by the MU-MIMO processing parameter calculation unit 404. A method for calculating these parameters is described using equations.

First, H given in equation (1) is decomposed into L and Q and transformed to a product of a lower triangular matrix L and a unitary matrix Q.

[Equation 2]

$$H = L*Q \tag{2}$$

[Equation 3]

$$L = \begin{bmatrix} l_{11} & 0 & 0 & 0 \\ l_{21} & l_{22} & 0 & 0 \\ l_{31} & l_{32} & l_{33} & 0 \\ l_{41} & l_{42} & l_{43} & l_{44} \end{bmatrix} \tag{3}$$

Consequently, the elements of the matrix L are obtained as DPC processing parameters and the conjugate transposed matrix of the unitary matrix Q is obtained as the matrix for transmission matrix multiplication processing.

According to this MU-MIMO processing, the control information calculation unit 410 can calculate effective channel gains $g_1$, $g_2$, $g_3$, $g_4$ which are control information for data as follows:

[Equation 4]

$$g_1 = l_{11}$$

$$g_2 = l_{22}$$

$$g_3 = l_{33}$$

$$g_4 = l_{44} \tag{4}$$

Further, the control information transmission parameter calculation unit 411 calculates a control information transmission parameter, using the calculated effective channel gains and the information about the spatial channel H.

One method of calculation is described below. First, the method calculates an inverse matrix $H^{-1}$ of the spatial channel H. Then, the method multiples a matrix of the effective channel gains by $H^1$ to obtain a control information transmission parameter p.

Thus, the control information transmission parameter is expressed as follows.

[Equation 5]

$$p = \begin{bmatrix} p_1 \\ p_2 \\ p_3 \\ p_4 \end{bmatrix} = H^{-1} * \begin{bmatrix} g_1 \\ g_2 \\ g_3 \\ g_4 \end{bmatrix} = H^{-1} * \begin{bmatrix} l_{11} \\ l_{22} \\ l_{33} \\ l_{44} \end{bmatrix} \tag{5}$$

Using this result, the control information transmission signal generating unit 412 multiplies a pilot signal d as a pilot signal for control information transmission 413 by the control information transmission parameter p to obtain a control information transmission signal x, where x is composed of four signal components x1, x2, x3, x4 which are input to the resource element mapping unit 405.

[Equation 6]

$$x = p*d = \begin{bmatrix} p_1 \\ p_2 \\ p_3 \\ p_4 \end{bmatrix} *d = \begin{bmatrix} p_1*d \\ p_2*d \\ p_3*d \\ p_4*d \end{bmatrix} \tag{6}$$

The resource element mapping unit 405 maps the input data and the control information transmission signals x onto time-frequency elements assigned for them respectively.

Figure 11:
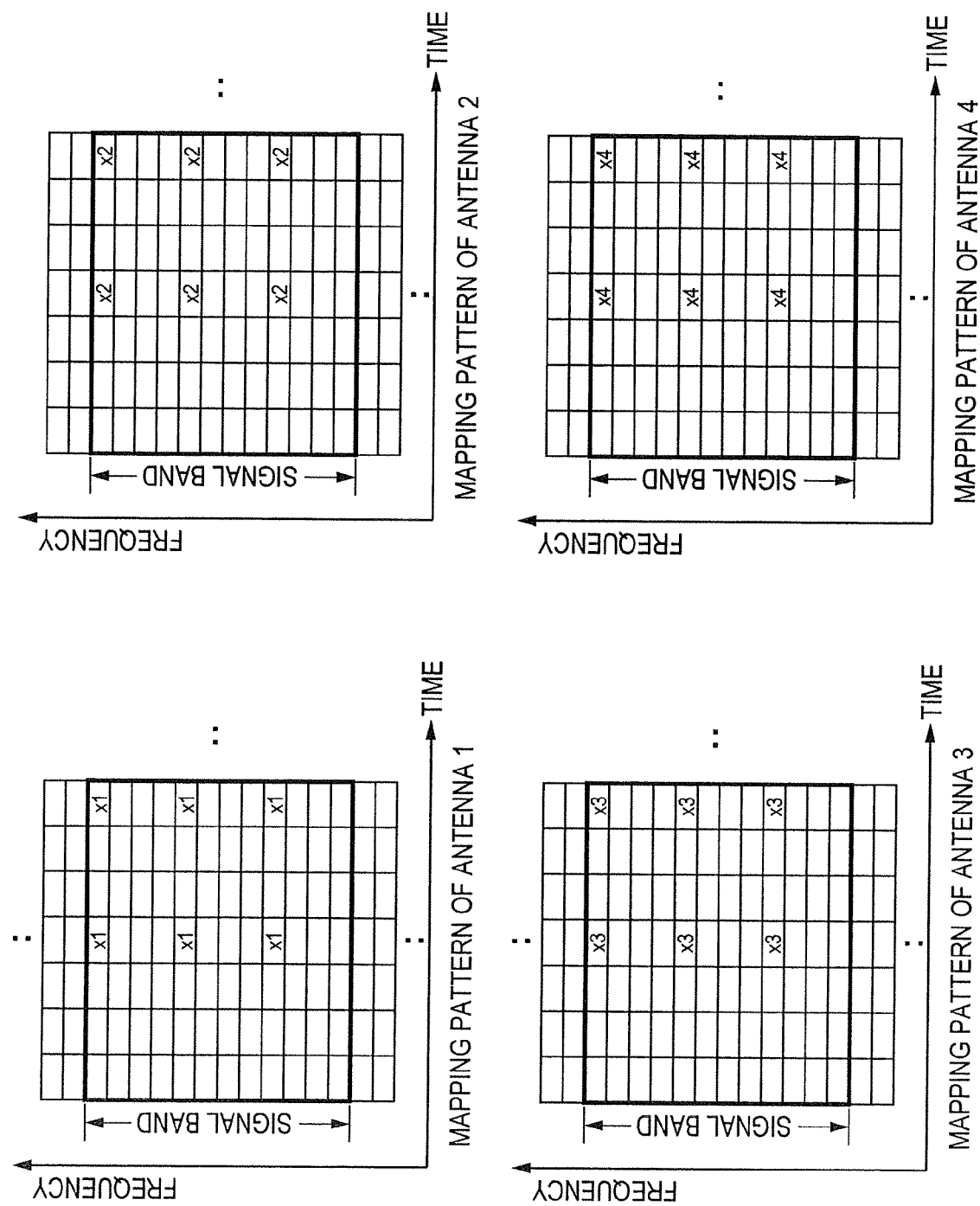
FIG. 11 is a diagram illustrating an example of a resource mapping pattern of pilots for control information transmission.

FIG. 11 illustrates an example of mapping onto time-frequency elements when the present exemplary embodiment is used.

Figure 15:
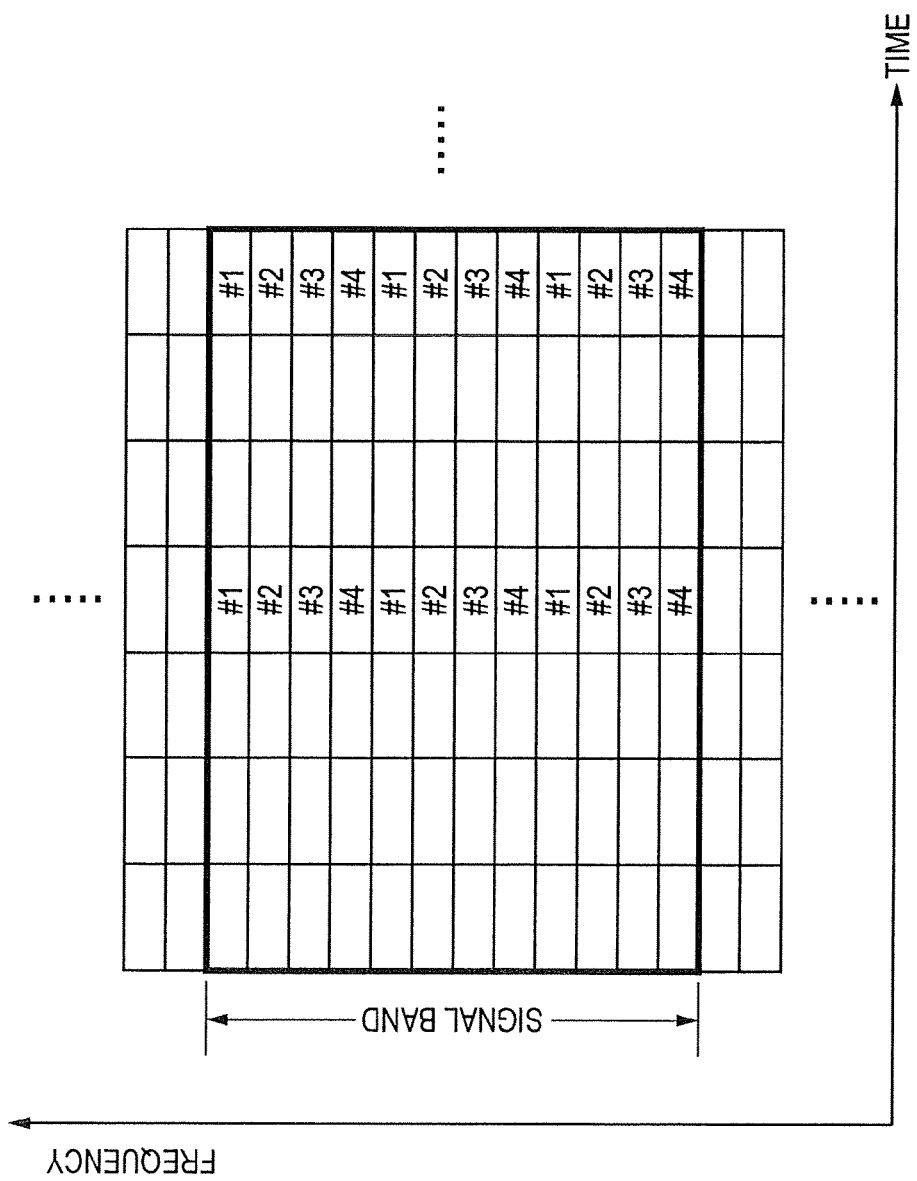
FIG. 15 is a diagram illustrating an example of a conventional resource mapping pattern of pilots for control information transmission.

For comparison purposes, FIG. 15 illustrates an example of conventional mapping. In FIG. 15, #1, #2, #3, #4 denote pilot signals for control information transmission corresponding to four data streams which are transmitted in parallel respectively. In the case of FIG. 15, because the above-described processing is not performed, four pilot signals are mapped onto different resource elements in order to estimate effective channels for four layers. Moreover, a pilot signal for one layer can only be mapped onto each of corresponding resource elements (corresponding positions in time and frequency) at different antennas. That is, a mapping pattern shown in FIG. 15 is the same for four transmit antennas. In other words, one antenna does not allow for mapping plural pilot signals concurrently (it is not allowed to map signals onto corresponding time-frequency elements at other antennas).

On the other hand, in the case of the example of resource element mapping pertaining to the present exemplary embodiment, different control information transmission signals are mapped onto corresponding resource elements at different transmit antennas. As in the example of FIG. 11, it is possible to map signals x1 to certain resource elements at transmit antenna 1, map signals x2 to corresponding resource elements at transmit antenna 2, map signals x3 to corresponding resource elements at transmit antenna 3, and map signals x4 to corresponding resource elements at transmit antenna 4, respectively. Thereby, the resource elements for transmitting control information at the respective antennas are reduced by 75% and it is possible to increase resource elements available for data transmission.

Next, a part of functional structure of a terminal 1 (corresponding to 101 in FIG. 1, 210 in FIG. 2, and 310 in FIG. 3) is shown in FIG. 5. Signals received through two receive antennas 500 are processed respectively by RF reception units 501 and FFT (Fast Fourier Transform) units 502. After resource element demapping performed by a resource element demapping unit 503, a control information acquisition unit 507 acquires plural pieces of control information 508 ($g_1$, $g_2$) signaled on corresponding resource elements. Also, from the resource demapping unit 503, a spatial channel estimation unit 506 receives pilot signals for spatial channel estimation transmitted from the base station and creates and feeds back a feedback signal containing spatial channel information 509 to the base station. It goes without saying that the control information acquisition unit 507 of another terminal 2 (corresponding to 102 in FIG. 1, 220 in FIG. 2, and 320 in FIG. 3), which is however not shown, acquires plural pieces of control information $g_3$, $g_4$.

Signals received at this resource element demapping unit 503 are expressed as in the following equation (7).

[Equation 7]

$$\begin{bmatrix} y_1 \\ y_2 \\ y_3 \\ y_4 \end{bmatrix} = H * x + n \qquad (7)$$

Here, y1 and y2 are signals received by the antennas of the terminal 1 and y3 and y4 are signals received by the antennas of the terminal 2. n is a noise vector indicating noise involved at each receive antenna. Substitution of the foregoing equations (5) and (6) into equation 7 yields the following.

[Equation 8]

$$\begin{bmatrix} y_1 \\ y_2 \\ y_3 \\ y_4 \end{bmatrix} = H*x+n = H*\begin{bmatrix} p_1 \\ p_2 \\ p_3 \\ p_4 \end{bmatrix}*d+n = \qquad (8)$$

$$H*H^{-1}\begin{bmatrix} l_{11} \\ l_{22} \\ l_{33} \\ l_{44} \end{bmatrix}*d+n = \begin{bmatrix} l_{11} \\ l_{22} \\ l_{33} \\ l_{44} \end{bmatrix}*d+n = \begin{bmatrix} l_{11}*d \\ l_{22}*d \\ l_{33}*d \\ l_{44}*d \end{bmatrix}+n$$

As indicated in equation (8), with the exclusion of influence of noise, a signal received by each receive antenna on this resource element is expressed by a product of each effective channel gain g and a pilot signal d. Here, each receiving station, once a base station with which it communicates has been determined, acquires a Cell ID unique to the base station, broadcasted by the base station, and can calculate a pilot signal d that is used by the base station, using this Cell ID. That is, d in equation (8) is known to each receiving station. Using this known d, each receiving station is to be able to acquire the gain g of an effective channel destined for it.

Further, using this control information acquired, the terminal device demodulates each data by means of a demodulation unit 504. Results output from the demodulation unit 504 are input to a decoding unit 505 and undergo processing such as error correction decoding and error detection, and received data is thus taken.

Figure 6:
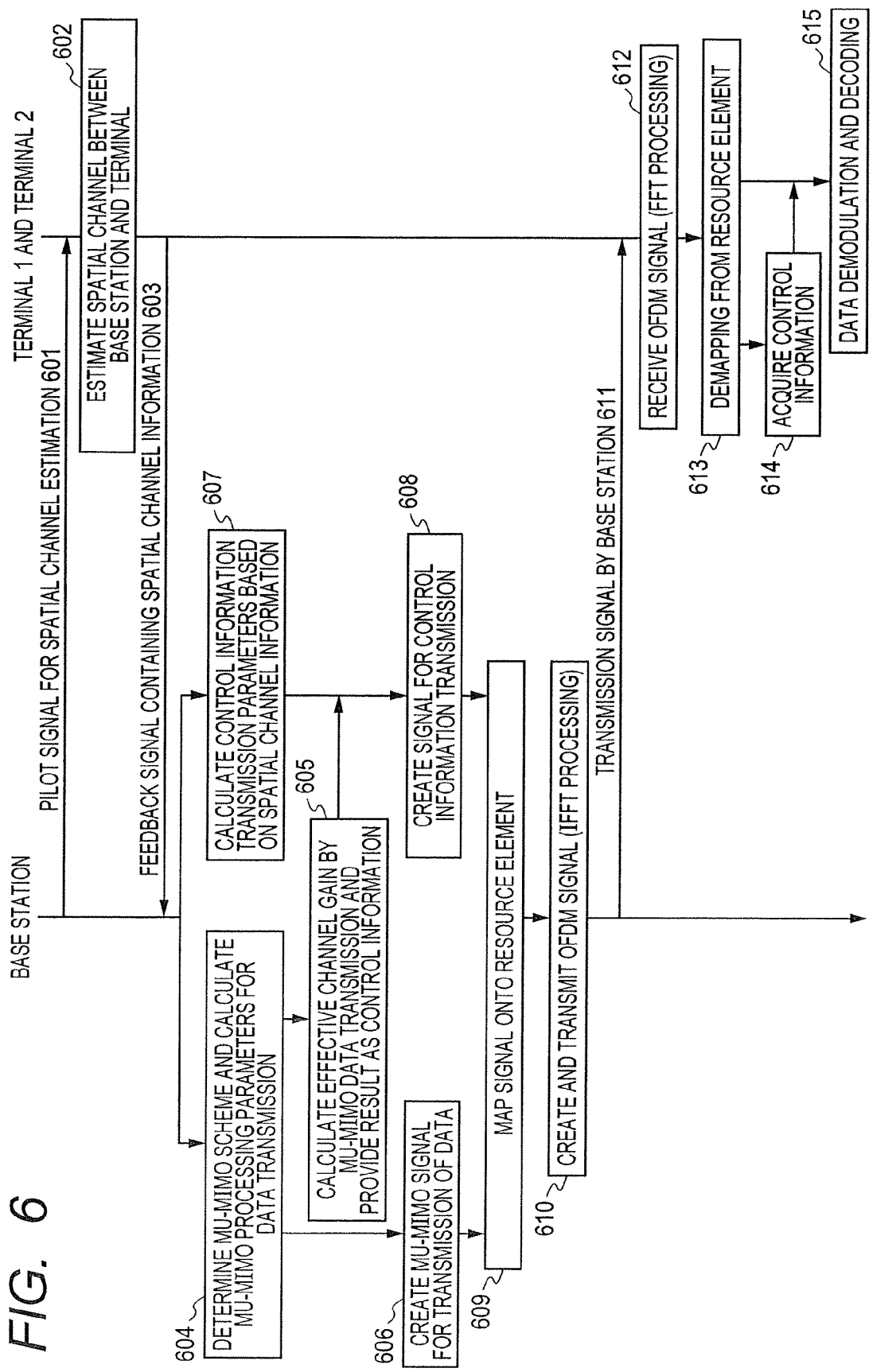
FIG. 6 is a flowchart illustrating operation of a radio communication system pertaining to the first exemplary embodiment.

FIG. 6 illustrates an example of a flowchart of operation between the base station and each terminal 1, 2 in the present exemplary embodiment described above. First, the base station transmits pilot signals for spatial channel estimation 601 to each terminal 1, 2. Each terminal 1, 2 estimates a spatial channel between the base station and the terminal, based on the pilot signal it received (602) and feeds back a feedback signal 603 containing estimated space channel information to the base station.

Based on this feedback signal 603, the base station determines an MU-MIMO scheme for data transmission and the MU-MIMO processing parameter calculation unit 404 calculates MU-MIMO processing parameters for data transmission (604). Thereby, the control information calculation unit 410 calculates effective channel gains by MU-MIMO data transmission and provides results as control information (605). Besides, the base station creates a MU-MIMO signal for transmission of data (606). The control information transmission parameter calculation unit 411 calculates a control information transmission parameter based on spatial channel information and control information (607). Base on this parameter, the control information transmission signal creation unit 412 creates a signal for control information transmission (608). Then, the resource element mapping unit 405 maps control information transmission signals onto resources (609). After IFFT processing for creating an OFDM signal is performed by the IFFT unit 407, the base station transmits the OFDM signal (610).

On the other hand, the terminal 1, 2 having received the transmission signal 611 by the base station executes FFT processing which is OFDM signal reception processing by means of the FFT unit 502 (612). Then, the terminal performs demapping by means of the resource demapping unit 503 (613), acquires control information (614), and terminates the process by performing data demodulation and decoding (615).

On the other hand, the terminal 1, 2 having received the transmission signal 611 by the base station executes FFT processing which is OFDM signal reception processing by means of the FFT unit 502 (612). Then, the terminal performs demapping by means of the resource demapping unit 503 (613), acquires control information (614), and terminates the process by performing data demodulation and decoding (615).

Subsequently, descriptions are provided for a modification example where a liner MU-MIMO processing is used for data transmission, unlike the nonlinear MU-MIMO data transmission scheme of the present exemplary embodiment detailed above. Although there are various schemes of liner MU-MIMO processing, a Block Diagonalization (BD) scheme is discussed below as an example.

By using pilot signals for spatial channel estimation transmitted by the base station, the terminal 1 and the terminal 2 estimate spatial channels H1 an H2 between itself and the base station and feed back information for the spatial channels H1 and H2 to the base station. From the feedback signals from the terminal 1 and the terminal 2, the base station acquires information related to the spatial channel H given in equation (1). The MU-MIMO processing parameter calculation unit 404 of the base station in FIG. 4 calculates parameters (precoding matrix) for carrying out liner MU-MIMO processing as follows.

First, H is block diagonalized by a Null space matrix W.

[Equation 9]

$$\begin{bmatrix} h_{11}^1 & h_{12}^1 & 0 & 0 \\ h_{21}^1 & h_{22}^1 & 0 & 0 \\ 0 & 0 & h_{11}^2 & h_{12}^2 \\ 0 & 0 & h_{21}^2 & h_{22}^2 \end{bmatrix} = H*W \qquad (9)$$

Space matrixes which are given in equations (10) and (11) for each user after the block diagonalization are decomposed into singular values.

[Equation 10]

$$H_1^1 = \begin{bmatrix} h_{11}^1 & h_{12}^1 \\ h_{21}^1 & h_{22}^1 \end{bmatrix} = U_1 \begin{bmatrix} \sigma_1^1 & 0 \\ 0 & \sigma_2^1 \end{bmatrix} V_1^H \qquad (10)$$

[Equation 11]

$$H_2^2 = \begin{bmatrix} h_{11}^2 & h_{12}^2 \\ h_{21}^2 & h_{22}^2 \end{bmatrix} = U_2 \begin{bmatrix} \sigma_1^2 & 0 \\ 0 & \sigma_2^2 \end{bmatrix} V_2^H \qquad (11)$$

Then, as the precoding matrix for use by the transmitting station, a matrix Q below is yielded.

[Equation 12]

$$Q = W * \begin{bmatrix} V_1 & 0 \\ 0 & V_2 \end{bmatrix} \quad (12)$$

By this MU-MIMO processing, effective channel gains $g_1$, $g_2$, $g_3$, $g_4$ for data can be calculated as follows:

[Equation 13]

$$g_1 = \sigma_1^1$$
$$g_2 = \sigma_2^1$$
$$g_3 = \sigma_1^2$$
$$g_4 = \sigma_2^2 \quad (13)$$

Here, transmission of control information g1, g2, g3, g4 can be implemented using the algorithm given in the equations (5) through (8).

Figure 7:
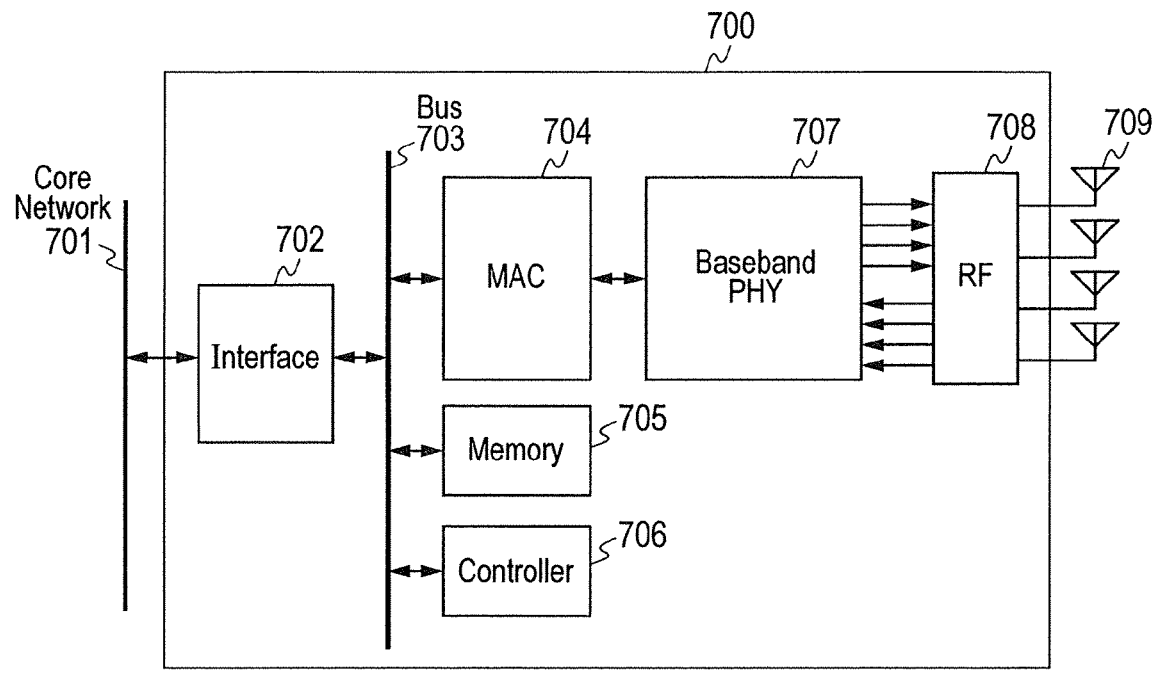
FIG. 7 is a diagram showing an example of a concrete structure of a base station device pertaining to the first exemplary embodiment.
Figure 8:
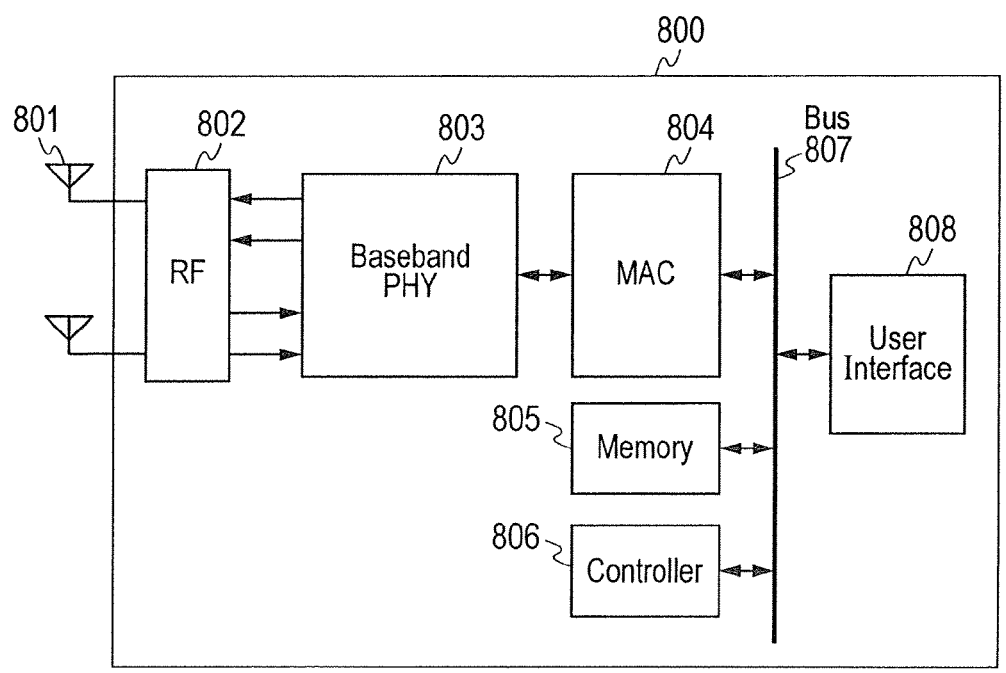
FIG. 8 is a diagram showing an example of a concrete structure of a terminal device pertaining to the first exemplary embodiment.

Each functional structure of the present exemplary embodiment described above can be implemented by components comprised in the base station and terminals, i.e., hardware such as a Central Processing Unit (CPU), a Digital Signal Processor, or FPGA (Field Programmable Gate Array). A concrete structure of each device is described below by way of the drawings. FIG. 7 is a diagram showing a concrete example of a base station device and FIG. 8 is a diagram showing a concrete example of a terminal device. It goes without saying that these devices can be implemented by hardware such as CPU, DSP, FPGA, and a memory, as mentioned above.

Referring to the structure of the base station shown in FIG. 7, the base station 700, particularly, its internal bus 703 is connected to a core network 701 through an interface 702. The interface 702 is an interface that provides connection between a wired network and the base station. A radio unit comprised of a media access controller (MAC) 704 among others, a memory 705, and a controller 706 are connected to the internal bus 703. Data from the core network 701 is once stored in the memory 705 and processed for transmission by the radio unit according to instructions of the controller 706 or data received and processed by the radio unit is stored once in the memory 705 and then output to the core network 701.

The radio unit is comprised of a baseband physical processing unit (Baseband PHY) 707 and a radio frequency unit (RF) 708 besides the MAC 704. The MAC 704 performs access control and gives instructions to the Baseband PHY 707. The Baseband PHY 707 has a function that performs transmission related processing, which will be detailed later, under control from the MAC 704, and outputs a transmission baseband signal to the RF 708 and a function that performs processing on a received baseband signal which is input from the RF 708 and outputs it to the MAC 704. The RF 708 has a function that up-converts a transmission baseband signal input from the Baseband PHY 707 up to a carrier frequency and outputs it to an antenna 709 and a function that down-converts a radio frequency signal received by an antenna 709 and outputs it as a received baseband signal to the Baseband PHY 707. Antennas 709 have a function that radiates a radio frequency signal which is input from the RF 708 to air space and a function that receives a signal propagated in air space and outputs it to the RF 708. The blocks and the like in the core part of the base station shown in FIG. 4 are configured within the Baseband PHY 707 of the radio unit, except for the RF transmission units 408 and the transmit antennas 409.

Likewise, the terminal shown in FIG. 8 is comprised of antennas 801, a radio frequency unit (RF) 802, a baseband unit (Baseband PHY) 803, a media access controller (MAC) 804, a memory 805, a controller 806, an internal bus 807, and a user interface 808 to which an input/output unit among others is connected. Operation details are the same as those of the base station described above and their detailed description is omitted here; however, the MAC 804 performs signal delivery and reception according to a control frame from the base station. Data received and processed by the radio unit equipped with the MAC 804, baseband physical processing unit (Baseband PHY) 803, and radio frequency unit (RF) 802, similarly to the radio unit of the base station, is stored in the memory 805 and output through the user interface 808 under control of the controller 806. The blocks and the like in the core part of the terminal shown in FIG. 5 are configured within the Baseband PHY 803 of the radio unit, except for the receive antennas 500 and the RF reception units 501.

Figure 9:
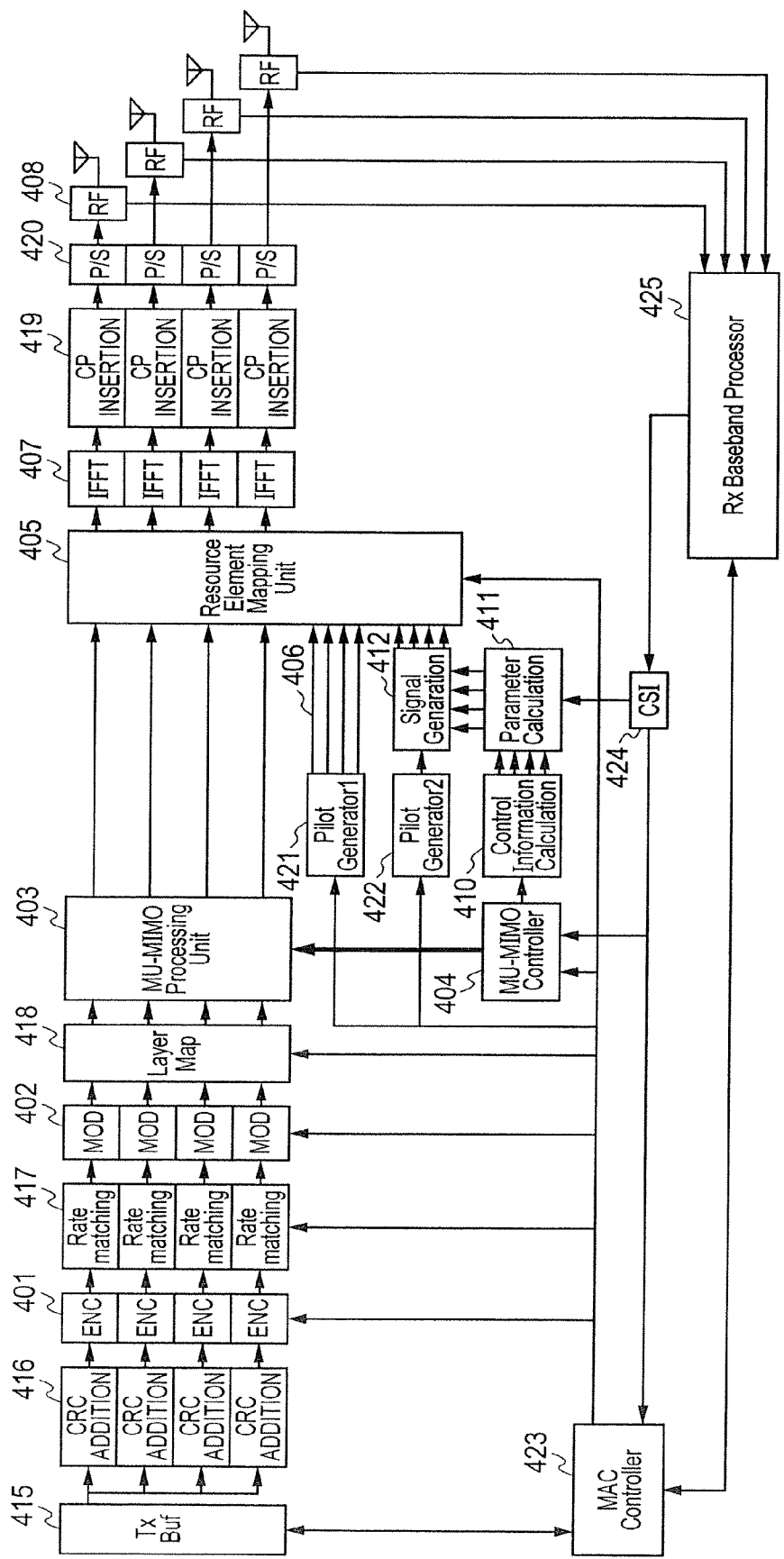
FIG. 9 is a diagram showing an example of an overall structure of a base station device pertaining to the first exemplary embodiment.

FIG. 9 is a diagram showing an example of an overall structure of a base station (corresponding to 100 in FIG. 1, 200 in FIG. 2, and 300 in FIG. 3) of the present exemplary embodiment with a focus on a configuration for transmission. Components identical to those in the core part of the base station in FIG. 4, described previously, are identified by the same numbers. Data in a transmit buffer (Tx Buf) 415 is divided and input to the baseband physical processing unit (Baseband PHY). Adding CRC (cyclic Redundancy Check) to data is performed by CRC addition units 416, the data is encoded by encoding units (ENC) 401, and rate matching is performed by rate matching units (Rate Matching) 417. Depending on a modulation scheme and a transmission rate for each transmission layer, the amount of data to be transmitted on each layer is determined. Then, transmission data is modulated and assigned to each layer by modulation units (MOD) 402 and a layer mapping unit (Layer Map) 418. MU-MIMO processing on parallel output data from the Layer Map 418 is performed by the MU-MIMO process execution unit (MU-MIMO Processing Unit) 403.

A receive baseband processing unit (Rx Baseband Processor) 425, which is not shown, within the baseband physical processing unit 707 (Baseband PHY) of the base station extracts spatial channel related information (Channel State Information: CSI) 424, using signals fed back from the terminals via the RFs 408, and stores that information into the memory 704. Based on this CSI 424 extracted, the MU-MIMO processing parameter calculation unit (MU-MIMO Controller) 404 calculates parameters required for MU-MIMO processing. Also, a control information transmission signal is created by the control information transmission parameter calculation unit (Parameter Calculation) 411 and the control information transmission signal creation unit (Signal Generation) 412, as described above. Besides, the CSI 424 stored in the memory 704 is read by a MAC controller 423 corresponding to the MAC 705 and used for scheduling calculation. In the present base station structure, the blocks except the RFs 408, MAC Controller 423, and CSI 424 can be configured within the Baseband PHY 707 of the radio unit in FIG. 7.

After the foregoing MU-MIMO processing is performed, both data and control information transmission signal are mapped onto resource elements by the resource element mapping unit 405. After IFFT by the IFFT units 407, a Cyclic Prefix (CP) is inserted by CP insertion units 419, thus creating OFDM signals which are in turn serialized by parallel-serial converters (P/S) 420 and output from the RF units 408 to the antennas 409.

In the same figure, Pilot Generators 421, 422 generate, respectively, the pilot signals for spatial channel estimation 406 and the pilot signal for control information transmission 413 described previously.

Figure 10:
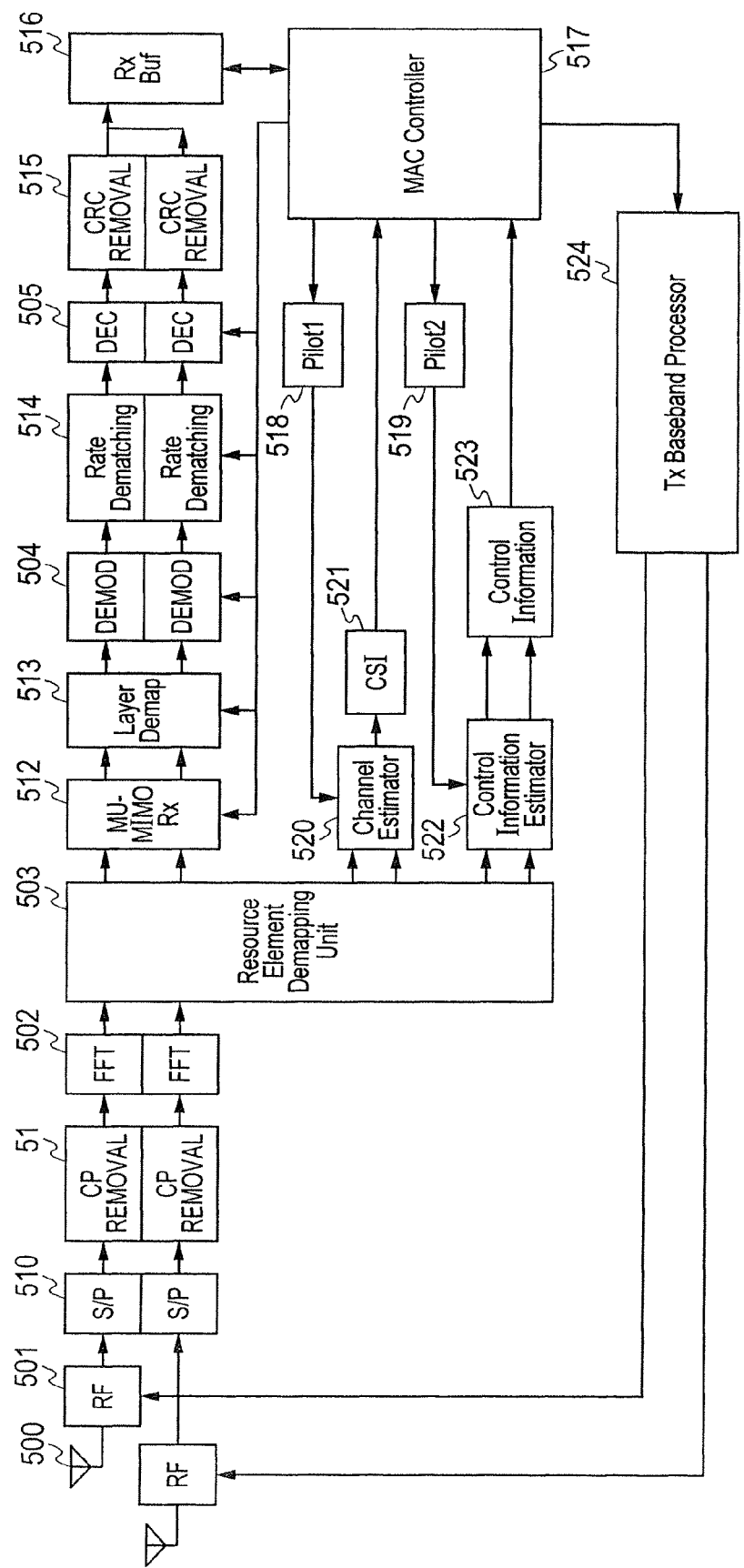
FIG. 10 is a diagram showing an example of an overall structure of a terminal device pertaining to the first exemplary embodiment.

FIG. 10 shows an example of an overall structure of a terminal (corresponding to 102 in FIG. 1, 220 in FIG. 2, and 320 in FIG. 3) of the present exemplary embodiment with a focus on a configuration for reception. Components identical to those in the core part of the terminal in FIG. 5, described previously, are identified by the same numbers. Signals received by respective receive antennas 500 are received by the RF reception units (RF) 501 and subjected to S/P conversion, CP removal, and FFT processing through serial-parallel converters (S/P) 510, CP removal units 511, and FTT units 502. Thereby, from OFDM signals, signals on resource elements are obtained and input to the resource element demapping unit 503. The signals input to the demapping unit 503 are demapped and the outputs from the element resources for control information are input to the channel estimation unit (Channel Estimator) 520. As described above, the channel estimation unit 520 estimates and outputs spatial channel related information (CSI) 521. The output CSI 521 is stored into the memory and fed back to the base station by a transmit baseband processing unit (represented by a TX Baseband Processor 524) which is a transmitting unit of the terminal.

Furthermore, according to the above-described method of the present exemplary embodiment, reception control information 523 is acquired by a control information acquisition unit (Control Information Estimator) 522 and the outputs from the element resources for data are demodulated and decoded using this control information 523. That is, after subjected to layer demapping, demodulation, decoding, and CRC removal by Layer Demap 513, demodulation units (DE-MOD) 504, Rate Dematching 514, decoding units (DEC) 505, CRC removal 515, and MU-MIMO reception processing units (MU-MIMO Rx) 512, received data is stored into an Rx buffer 516 and output to an interface device, which is not shown, by instructions of a MAC controller 517. In the same figure, a block 512 is a MU-MIND reception processing unit (MU-MIND Rx) that is used in the following exemplary embodiment and description of the block 512 is omitted in the present exemplary embodiment. In the terminal structure of FIG. 10, the blocks except the antennas 500, RFs 501, MAC Controller 517, and CSI 521 can be configured within the Baseband PHY 803 in FIG. 8.

Embodiment 2

Figure 12:
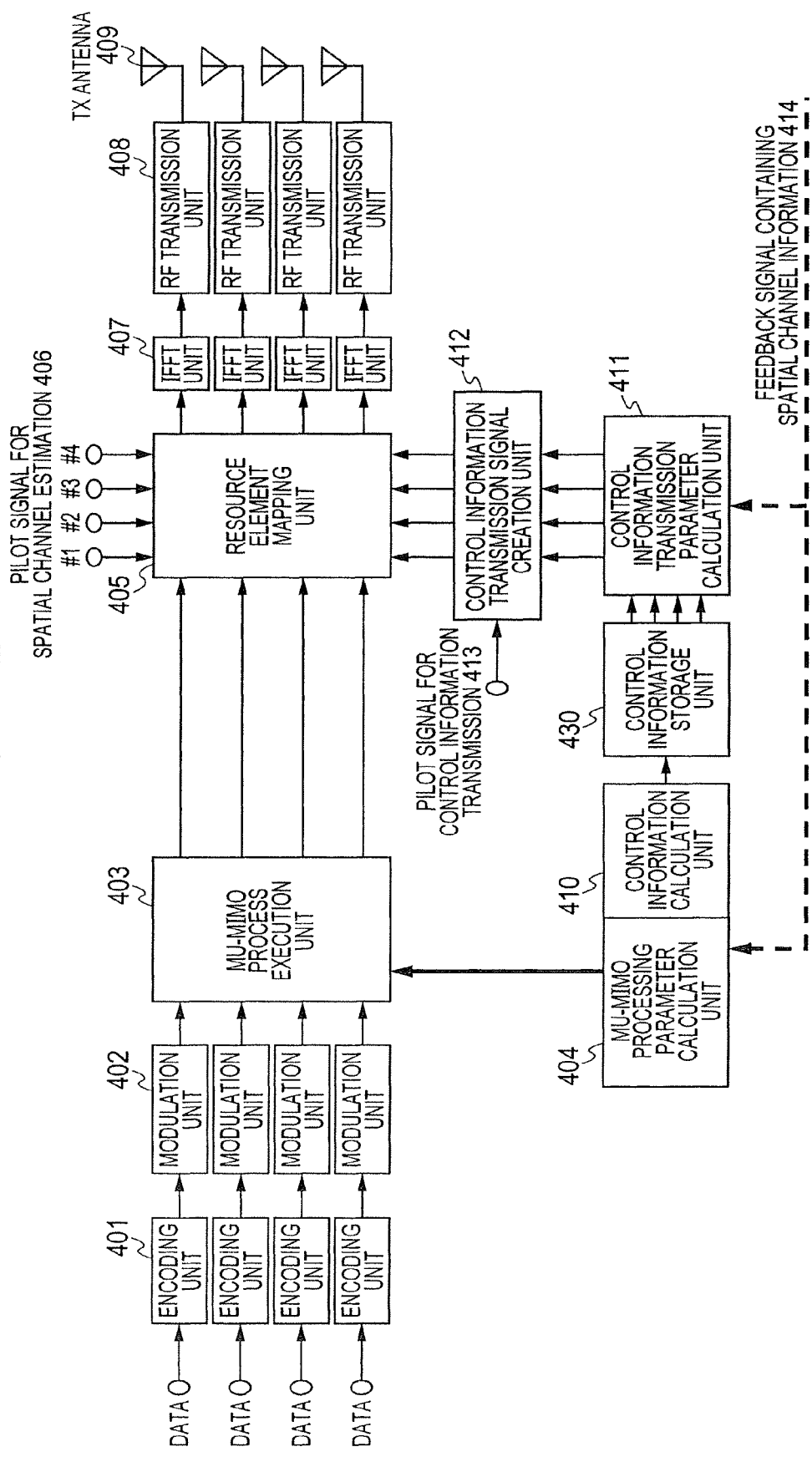
FIG. 12 is a diagram showing partial functional blocks of a base station device pertaining to a second exemplary embodiment.
Figure 13:
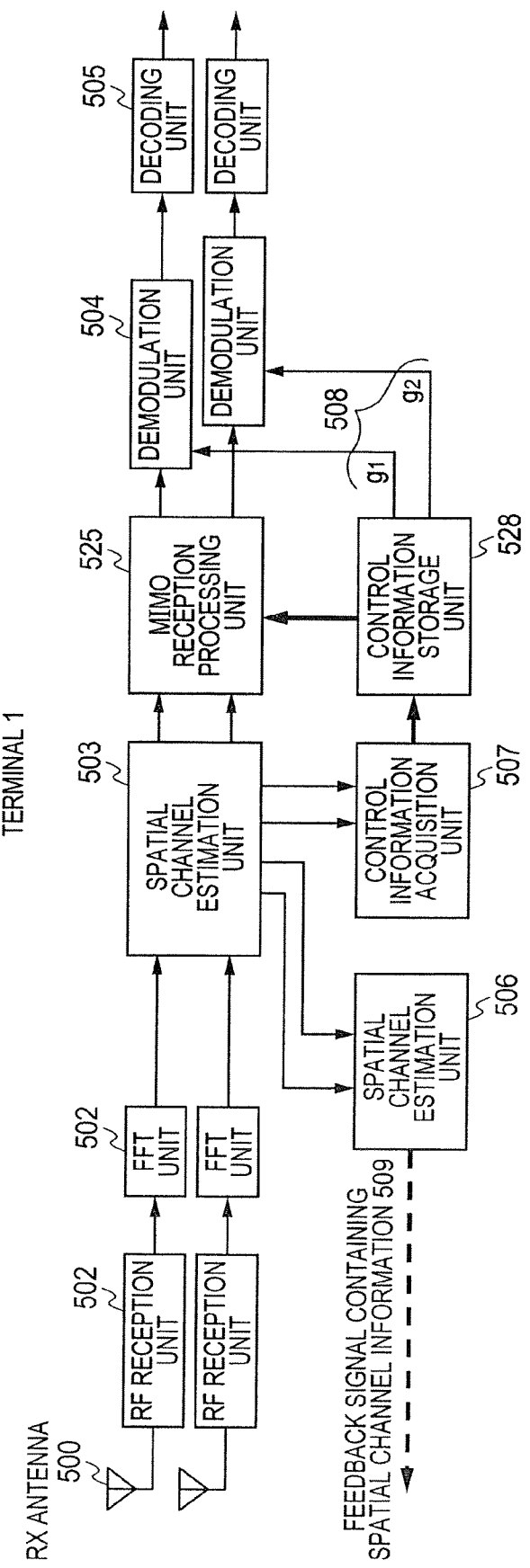
FIG. 13 is a diagram showing partial functional blocks of a terminal device pertaining to the second exemplary embodiment.
Figure 14:
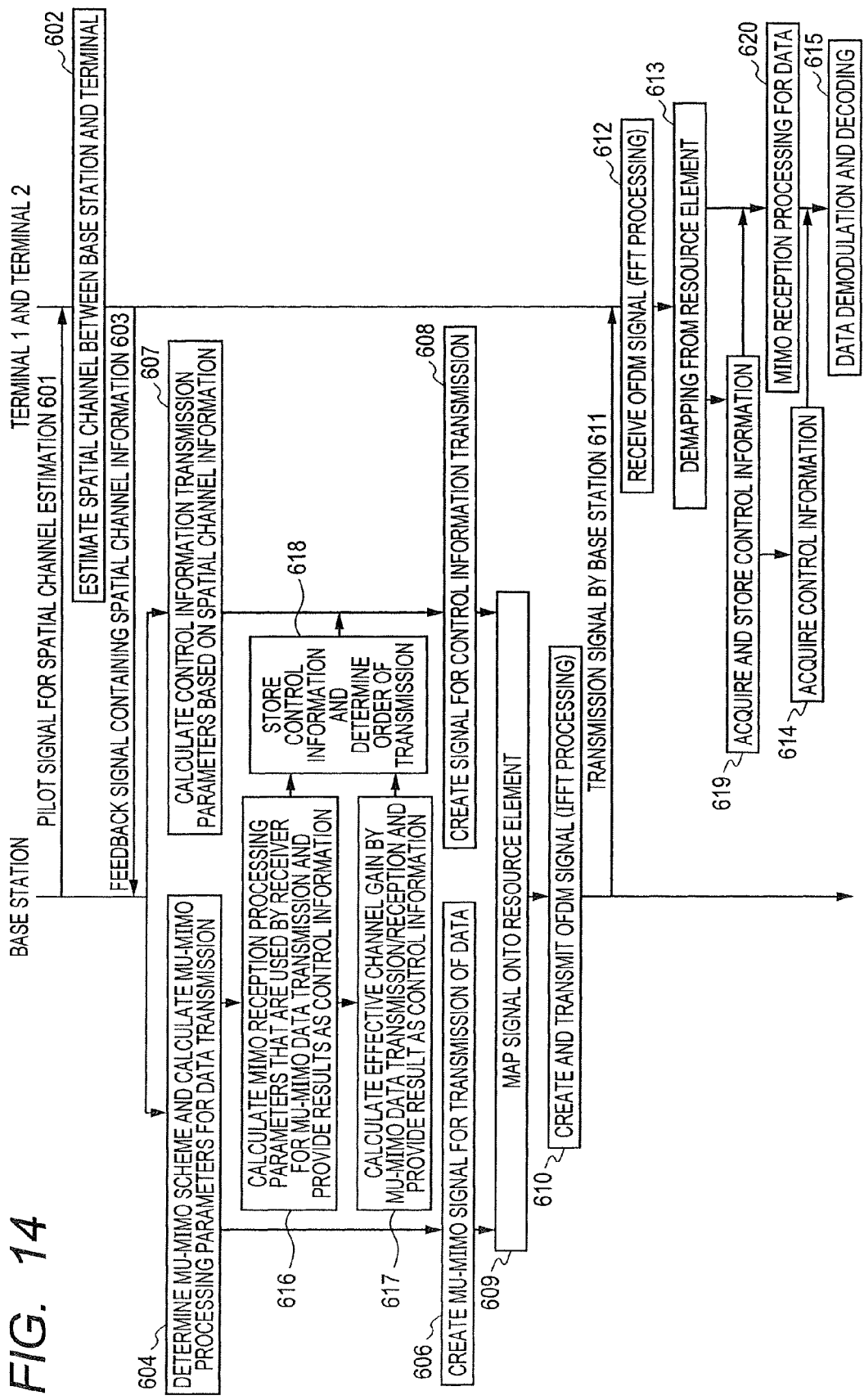
FIG. 14 is a flowchart illustrating operation of a radio communication system pertaining to the second exemplary embodiment.

As a second exemplary embodiment, descriptions are provided for a system in which MU-MIMO data transmission involves both MU-MIMO processing at a base station side and MIMO reception processing at a terminal side, using FIGS. 12 through 14. This exemplary embodiment suggests application to an MU-MIMO data transmission system (refer to non-patent literature 4) in which a terminal cannot calculate MIMO reception processing parameters by itself and a base station needs to calculate and then communicate these parameters to the terminal. That is, control information that is transmitted from a base station to a terminal in this exemplary embodiment includes MIMO reception processing parameters besides the effective channel gains in the exemplary embodiment 1.

In the present exemplary embodiment, MIMO reception processing parameters that are used by terminal 1 and terminal 2 are calculated by a base station according to a method specified in non-patent literature 4. This control information for the terminals 1, 2 is expressed by matrixes F1 (equation 14) and F2 (equation 15) below, respectively.

[Equation 14]

$$F_1 = \begin{bmatrix} f_{11}^1 & f_{12}^1 \\ f_{21}^1 & f_{22}^1 \end{bmatrix} \quad (14)$$

[Equation 15]

$$F_2 = \begin{bmatrix} f_{11}^2 & f_{12}^2 \\ f_{21}^2 & f_{22}^2 \end{bmatrix} \quad (15)$$

In the present exemplary embodiment, the base station needs to signal the elements of the matrix F1 to the terminal 1 and the elements of the matrix F2 to the terminal 2. For this purpose, the base station first determines values of control information as given in equation (16).

[Equation 16]

$$g_1 = f_{11}^1$$

$$g_2 = f_{21}^1$$

$$g_3 = f_{11}^2$$

$$g_4 = f_{21}^2 \quad (16)$$

This set of control information is transmitted to the terminals by the method set forth in the exemplary embodiment 1, so that the terminal 1 and the terminal 2 each can acquire a half of the parameters in the equations 14, 15 required for MIMO reception processing. The terminal 1 and the terminal 2 store the above values they acquired into a control information storage unit (526 in FIG. 13).

Then, the base station determines values of control information that are given in equation (17).

[Equation 17]

$$g_1 = f_{12}^1$$

$$g_2 = f_{22}^1$$

$$g_3 = f_{12}^2$$

$$g_4 = f_{22}^2 \quad (17)$$

This set of control information is transmitted to the terminals by the method set forth in the exemplary embodiment 2, so that the terminal 1 and the terminal 2 can acquire the remaining half of the parameters relevant to the equations 14, 15. The terminal 1 and the terminal 2 store the above values they acquired into the control information storage unit and, together with the previously stored values relevant to the equation 16, can acquire the parameters for a MIMO reception processing unit (525 in FIG. 13). Thereby, MU-MIMO transmission and reception processing can be accomplished in the system of the present exemplary embodiment.

Thereafter, effective channel gains in accordance with MU-MIMO processing of non-patent literature 4 are transmitted as control information by the method set forth in the exemplary embodiment 1.

FIG. 12 and FIG. 13 show block structural diagrams of a base station device and a terminal device in their core part in the present exemplary embodiment. The terminal 1 shown in FIG. 13 acquires the above-mentioned sets of information and performs demodulation and decoding processing on received signals by means of a demodulation unit 504 and a decoding unit 505.

The core part of the base station device according to the present exemplary embodiment is shown in FIG. 12. Components common to the base station device of the exemplary embodiment 1 shown in FIG. 4 are assigned the same numbers. A control information storage unit 430 is added, because control information is increased in the present exemplary embodiment. The control information transmission method is fundamentally carried out in the same way as for the exemplary embodiment 1. However, transmitting two sets of MIMO reception processing parameters for the terminals, each set comprising four parameters given in the above equations 16, 17, stored in the control information storage unit 430, first takes place prior to transmitting effective channel gains.

In FIG. 13, components common to the terminal device of the exemplary embodiment 1 shown in FIG. 5 are assigned the same numbers. In the present exemplary embodiment, the control information storage unit 526 and the MIMO reception processing unit 525 are newly added. In this structure, plural pieces of control information are acquired from resource elements that are used for transmitting control information and stored into the control information storage unit 526. After all MIMO reception processing parameters have been acquired, MU-MIMO data reception processing is performed using these parameters by the MU-MIMO data reception processing unit 525 and received data is demultiplexed. Thereafter, demodulating each data is performed using the acquired effective channel gains. Results output from the demodulation unit 504 are input to the decoding unit 505 and undergo processing such as error correction decoding and error detection, and received data is thus taken. Again, in the present exemplary embodiment, the terminal 2 is also configured similarly, and it goes without saying that effective channel gains for the terminal 2 are control information $g_3$, $g_4$ instead of control information $g_1$, $g_2$.

FIG. 14 illustrates a flowchart of operation between the base station and each terminal in the present exemplary embodiment described above. The same numbers as in the operation flowchart for the exemplary embodiment 1 shown in FIG. 6 denote the same steps. In the present exemplary embodiment, the base station calculates MIMO reception processing parameters that are used by each terminal for MU-MIMO data transmission and provide results as control information (616). As is the case for the exemplary embodiment 1, the base station also calculates effective channel gains by MU-MIMO data transmission and reception and provides results as control information (617), stores these pieces of control information, and determines an order of transmitting them (618).

At the terminal 1, 2, by demapping (613) from resource elements, the terminal acquires and stores control information (619), performs MIMO reception processing for data (620) using acquired MIMO reception processing parameters, and then demodulates data using acquired effective channel gains and performs decoding (615), as described in the foregoing context.

INDUSTRIAL APPLICABILITY

The present invention relates a technical field of radio communication and is particularly beneficial as a radio communication technique for implementing communication using plural antennas.

REFERENCE SIGNS LIST 100, 200, 700 . . . Base station
101, 102, 210, 220, 310, 320, 800 . . . Terminal
103, 104, 105, 201 thru 204, 211, 212, 221, 222, 301 thru 304, 311, 312, 321, 322, 709, 801 . . . Antenna
300 . . . Transmitting station
310, 320 . . . Receiving station
331 thru 334 . . . Effective channel
401 . . . Encoding unit
402 . . . Modulation unit
403 . . . MU-MIMO process execution unit
404 . . . MU-MIMO processing parameter calculation unit
405 . . . Resource element mapping unit
406 . . . Pilot signal for spatial channel estimation
407 . . . IFFT unit
408 . . . RF transmission unit
409 . . . Transmit antenna
410 . . . Control information calculation unit
411 . . . Control information transmission parameter calculation unit
412 . . . Control information transmission signal creation unit
413 . . . Pilot signal for control information transmission
414 . . . Feedback signal containing spatial channel information
500 . . . Receive antenna
501 . . . RF reception unit
502 . . . FFT unit
503 . . . Resource element demapping unit
504 . . . Demodulation unit
505 . . . Decoding unit
506 . . . Spatial channel estimation unit
507 . . . Control information acquisition unit
508 . . . Control information
509 . . . Feedback signal containing spatial channel information
701 . . . Core network
702, 808 . . . Interface
703, 807 . . . Bus
704, 804 . . . Media access controller (MAC)
705, 805 . . . Memory
706, 806 . . . Controller
707, 803 . . . Baseband unit
708, 802 . . . Radio frequency unit

The invention claimed is:

1. A radio communication system, comprising:
a plurality of receiving stations; and
a transmitting station having a plurality of antennas transmitting individual data destined for each of the receiving stations, and a controller,
wherein the controller of the transmitting station:
calculates a data transmission processing parameter using spatial channel related information,
calculates effective channel gains for the data using the spatial channel related information,
transmits a control information transmission signal to each of the receiving stations using corresponding radio resources, and
transmits the data processed using the data transmission processing parameter to each of the receiving stations,
wherein each of the receiving stations performs reception processing of the data using the effective channel gains,
wherein the spatial channel related information is a matrix whose elements are all radio paths between the receiving stations and the antennas of the transmitting station, and
wherein the transmitting station multiplies a pilot signal and a control information transmission parameter, and transmits a result thereof to each of the receiving stations as the control information transmission signal, where the control information transmission parameter is a product of the effective channel gains and an inverse matrix of the spatial channel related information.

2. The radio communication system according to claim 1, wherein:
the spatial channel related information is included in feedback signals from the receiving stations to the transmitting station.

3. The radio communication system according to claim 1, wherein:
the effective channel gains each individually correspond to a channel between one of the antennas of the transmitting station and one of the base stations.

4. The radio communication system according to claim 1, wherein:
the effective channel gains are calculated from a decomposition of the spatial channel related information.

5. The radio communication system according to claim 1, wherein:
the data and the control information transmission signal are transmitted from the transmitting station to the receiving stations by nonlinear processing.

6. A base station, comprising:
a plurality of antennas that transmit individual data destined for each of a plurality of terminals, and a controller;
wherein the controller of the base station:
calculates a data transmission processing parameter using spatial channel related information,
calculates effective channel gains for the data using the spatial channel related information,
transmits a control information transmission signal to each of the terminals, using corresponding radio resources, and
transmits the data processed using the data transmission processing parameter to each of the terminals,
wherein the spatial channel related information is a matrix whose elements are all radio paths between the receiving stations and the antennas of the transmitting station, and
wherein the transmitting station multiplies a pilot signal and a control information transmission parameter, and transmits a result thereof to each of the receiving stations as the control information transmission signal, where the control information transmission parameter is a product of the effective channel gains and an inverse matrix of the spatial channel related information.

7. The base station according to claim 6, wherein:
the spatial channel information is included in feedback signals from the terminals.

8. The base station according to claim 6, wherein:
the effective channel gains each individually correspond to a channel between one of the antennas of the base station and one of the terminals.

9. The base station according to claim 6, wherein:
the effective channel gains are calculated from a decomposition of the spatial channel related information.

10. The base station according to claim 6, wherein:
the data and the control information transmission signal are transmitted from the base station to the terminals by nonlinear processing.

11. A radio communication method for transmitting individual data destined for each of a plurality of receiving stations from a transmitting station, the radio communication method comprising:
calculating, by the transmitting station, a data transmission processing parameter using spatial channel related information;
calculating, by the transmitting station, effective channel gains using the spatial channel related information;
transmitting, by the transmitting station, a control information transmission signal to each of the receiving stations using corresponding radio resources;
transmitting, by the transmitting station, the data processed using the data transmission processing parameter to each of the receiving stations; and
performing, by each of the receiving stations, reception processing of the data using the effective channel gains,
wherein the spatial channel related information is a matrix whose elements are all radio paths between the receiving stations and the antennas of the transmitting station, and
wherein the transmitting station multiplies a pilot signal and a control information transmission parameter, and transmits a result thereof to each of the receiving stations as the control information transmission signal, where the control information transmission parameter is a product of the effective channel gains and an inverse matrix of the spatial channel related information.

12. The radio communication method according to claim 11, wherein:
the spatial channel information is included in feedback signals from the receiving stations to the transmitting station.

13. The radio communication method according to claim 11, wherein:
the effective channel gains each individually correspond to a channel between one of the antennas of the transmitting station and one of the base stations.

14. The radio communication method according to claim 11, wherein:
the effective channel gains are calculated from a decomposition of the spatial channel related information.

15. The radio communication method according to claim 11, wherein:
the data and the control information transmission signal are transmitted from the transmitting station to the receiving stations by nonlinear processing.

\* \* \* \* \*